(12) United States Patent
Kim et al.

(10) Patent No.: US 11,996,882 B2
(45) Date of Patent: May 28, 2024

(54) IMPULSE WIRELESS COMMUNICATION SYSTEM

(71) Applicant: UIF (University Industry Foundation), Yonsei University, Seoul (KR)

(72) Inventors: Tae Wook Kim, Seoul (KR); Junyoung Jang, Seoul (KR)

(73) Assignee: UIF (University Industry Foundation), Yonsei University, Seoul (KR)

( * ) Notice: Subject to any disclaimer, the term of this patent is extended or adjusted under 35 U.S.C. 154(b) by 10 days.

(21) Appl. No.: 17/992,858

(22) Filed: Nov. 22, 2022

(65) Prior Publication Data

US 2023/0170932 A1 Jun. 1, 2023

(30) Foreign Application Priority Data

Nov. 29, 2021 (KR) ........................ 10-2021-0166382

(51) Int. Cl.
*H04B 1/71* (2011.01)
*H04B 1/7163* (2011.01)
*H04B 1/7183* (2011.01)

(52) U.S. Cl.
CPC ....... *H04B 1/7183* (2013.01); *H04B 1/71632* (2013.01)

(58) Field of Classification Search
CPC .......................... H04B 1/7183; H04B 1/71632
See application file for complete search history.

(56) References Cited

U.S. PATENT DOCUMENTS

| 7,236,513 B2 * | 6/2007 | Iida ..................... H04B 1/7174 375/279 |
| 7,822,159 B2 * | 10/2010 | Fujita .................. H04L 7/0091 375/353 |

(Continued)

FOREIGN PATENT DOCUMENTS

| KR | 10-0023548 B1 | 12/1986 |
| KR | 10-2168362 B1 | 10/2020 |

(Continued)

OTHER PUBLICATIONS

Geunhaeng Lee, et al., 'An IR-UWB CMOS Transceiver for High-Date-Rage, Low-Power, and Short-Range Communication', IEEE Journal of Solid-State Circuits, vol. 54, No. 8, Aug. 2019, pp. 2163-2174.

(Continued)

*Primary Examiner* — Freshteh N Aghdam
(74) *Attorney, Agent, or Firm* — Park, Kim & Suh, LLC (57) ABSTRACT

An impulse wireless communication system includes an oscillation signal generator that generates a plurality of oscillation signals having a delay interval with each other and having the same phase and amplitude or different phases and amplitudes, an envelope signal generator that extracts a sync signal and a data signal making up communication signal data and generates an envelope signal for the sync signal and an envelope signal for the data signal, a signal synthesizer that synthesizes the plurality of oscillation signals with the envelope signals, an envelope signal extractor that extracts a plurality of modulation envelope signals from the impulse signal, an amplitude phase determiner that determines the phase and the amplitude in the plurality of modulation envelope signals based on the plurality of oscillation signals, and a calculator that extracts the envelope signals from the plurality of modulation envelope signals based on the phase and the amplitude.

11 Claims, 9 Drawing Sheets

(56) References Cited

U.S. PATENT DOCUMENTS

| | | | |
|---|---|---|---|
| 7,822,161 B2* | 10/2010 | Lee | H04L 7/048 375/256 |
| 8,559,554 B2* | 10/2013 | Vossiek | H04B 1/7174 375/259 |
| 9,749,126 B2 | 8/2017 | Kim et al. | |
| 10,038,455 B2 | 7/2018 | Dartois | |
| 2005/0141602 A1* | 6/2005 | Hyun | H04B 1/7174 375/219 |
| 2008/0260019 A1* | 10/2008 | Aoyagi | G01S 7/006 332/108 |
| 2009/0232197 A1* | 9/2009 | Mimura | H04B 1/7174 375/239 |
| 2019/0018127 A1* | 1/2019 | Guarin Aristizabal | G01S 13/88 |

FOREIGN PATENT DOCUMENTS

| | | |
|---|---|---|
| KR | 10-2021-0074976 A | 6/2021 |
| WO | 2014/167861 A1 | 10/2014 |

OTHER PUBLICATIONS

Sander A. Mann, et al., 'Broadband delay lines and nonreciprocal resonances in unidirectional waveguides', Physical Review B 100, 020303(R) (2019), 5pages.

* cited by examiner

IMPULSE WIRELESS COMMUNICATION SYSTEM

STATEMENT REGARDING GOVERNMENT SPONSORED RESEARCH OR DEVELOPMENT

The inventive concept is derived from research conducted as part of ICT Convergence Industry Innovation Technology Development (R&D) by Ministry of Science and ICT (Project No.: 1711126437, Project No.: 2017-0-00418-005, Research project name: Time domain artificial intelligence radar SoC (System On a Chip) design study using ultra-high-speed sampling technique, project management institution: Information and Communication Planning and Evaluation Institute, task performing institution: Yonsei University Industry-Academic Cooperation Foundation, research period: 2021 Jan. 1~2021 Dec. 31.

Meanwhile, there is no property interest of the Korean government in any aspect of the inventive concept.

CROSS-REFERENCE TO RELATED APPLICATIONS

A claim for priority under 35 U.S.C. § 119 is made to Korean Patent Application No. 10-2021-0166382 filed on Nov. 29, 2021, in the Korean Intellectual Property Office, the entire contents of which are hereby incorporated by reference.

BACKGROUND

Embodiments of the inventive concept described herein relate to an impulse wireless communication system for performing wireless communication using a wideband impulse signal.

In general, an ultra-wide band (UWB) communication system occupies a very wide frequency band compared to an existing narrowband communication system or an existing wideband communication system. The UWB system refers to a system which occupies a frequency band of 20% of a center frequency band or occupies a frequency band greater than or equal to 500 MHz.

As such, the UWB system uses a very short pulse in terms of time to occupy a wide frequency band. Thus, when a pulse is used for communication, it is possible to transmit a signal using low power due to a low duty cycle and it shows strong characteristics against multipath noise.

Meanwhile, the UWB system may use various modulation and demodulation schemes to transmit a signal using the pulse. There are a pulse amplitude modulation (PAM) scheme for transmitting a signal on the amplitude of a pulse, an on off keying (OOK) scheme for transmitting a signal depending on whether there is a pulse, a pulse shape modulation (PSM) scheme for transmitting a signal using different pulses, a pulse position modulation (PPM) scheme for transmitting a signal using the position of the pulse as such modulation and demodulation technologies.

However, the signal transmission scheme by existing PPM may provide a high communication speed. However, because the time necessary for the PPM scheme increases as the amount of data increases, there is a limit in increasing the transmission speed by wireless communication.

Thus, there is a need for a technology for increasing a transmission speed by wireless communication using a modulation technology added to the existing PPM scheme.

SUMMARY

Embodiments of the inventive concept provide an impulse wireless communication system for combining different modulation schemes to efficiently perform wireless communication of an impulse signal.

According to an embodiment, an impulse wireless communication system may include an oscillation signal generator that generates a plurality of oscillation signals having a delay interval with each other and having the same phase and amplitude or different phases and amplitudes, an envelope signal generator that extracts a sync signal and a data signal making up communication signal data and generates an envelope signal for the sync signal and an envelope signal for the data signal, a signal synthesizer that synthesizes the plurality of oscillation signals with the envelope signals to generate an impulse signal, an envelope signal extractor synchronized with the oscillation signal generator based on the sync signal to extract a plurality of modulation envelope signals from the impulse signal, an amplitude phase determiner that determines the phase and the amplitude in the plurality of modulation envelope signals based on the plurality of oscillation signals, and a calculator that extracts the envelope signals from the plurality of modulation envelope signals based on the phase and the amplitude.

Furthermore, the oscillation signal generator according to an embodiment of the inventive concept may include a first oscillation signal generator that generates a first oscillation signal transmitted according to a first amplitude and a first phase corresponding to a first bit value and a second oscillation signal generator that generates a second oscillation signal transmitted according to a second amplitude and a second phase, which correspond to a second bit value and are the same as or different from the first amplitude and the first phase.

Furthermore, the impulse wireless communication system according to an embodiment of the inventive concept may further include a data signal bit calculator that calculates a third bit value indicating a position of the data signal with respect to the sync signal in the communication signal data and a first data time interval calculator that calculates a first time interval between a time point when the sync signal is generated and a time point when the data signal is generated, based on the third bit value.

Furthermore, the impulse wireless communication system according to an embodiment of the inventive concept may further include a sync signal extractor that extracts the sync signal from the communication signal data, a data signal extractor that extracts the data signal where the first time interval is delayed with respect to the sync signal from the communication signal data using the first time interval, a first envelope signal generator that generates a first envelope signal based on the sync signal, and a second envelope signal generator that generates a second envelope signal based on the data signal.

Furthermore, the impulse wireless communication system according to an embodiment of the inventive concept may further include an oscillation signal bit calculator that calculates oscillation bit data including the first bit value and the second bit value.

Furthermore, the impulse wireless communication system according to an embodiment of the inventive concept may further include a third oscillation signal generator that generates a third oscillation signal having the same phase as the first phase of the first oscillation signal and the same amplitude as the first amplitude of the first oscillation signal based on the sync signal and a fourth oscillation signal generator that generates a fourth oscillation signal having the same phase as the second phase of the second oscillation signal and the same amplitude as the second amplitude of the second oscillation signal based on the sync signal.

Furthermore, the impulse wireless communication system according to an embodiment of the inventive concept may further include a first modulation envelope signal extractor that mixes the third oscillation signal with the impulse signal and extracts a first modulation envelope signal corresponding to the first envelope signal and a second modulation envelope signal extractor that mixes the fourth oscillation signal with the impulse signal and extracts a second modulation envelope signal corresponding to the second envelope signal.

Furthermore, the impulse wireless communication system according to an embodiment of the inventive concept may further include a modulation envelope signal synthesizer that synthesizes the first modulation envelope signal with the second modulation envelope signal to generate a first synthesis modulation envelope signal, a comparator that changes the first synthesis modulation envelope signal corresponding to an analog signal to a second synthesis modulation envelope signal in the form of a rectangular wave, and an edge detector that detects a first edge time point when a waveform of the first modulation envelope signal rises and a first falling time point when the waveform of the first modulation envelope signal falls in the second synthesis modulation envelope signal and detects a second edge time point when a waveform of the second modulation envelope signal rises and a second falling time point when the waveform of the second modulation envelope signal falls in the second synthesis modulation envelope signal.

Furthermore, the impulse wireless communication system according to an embodiment of the inventive concept may further include a first amplitude phase determiner that determines the phase and the amplitude of the first modulation envelope signal corresponding to the first bit value based on the first edge time point and the first falling time point and a second amplitude phase determiner that determines the phase and the amplitude of the second modulation envelope signal corresponding to the second bit value based on the second edge time point and the second falling time point.

Furthermore, the impulse wireless communication system according to an embodiment of the inventive concept may further include a second data time interval calculator that calculates a second time interval between a time point when the first modulation envelope signal is generated and a time point when the second modulation envelope signal is generated, based on the first edge time point and the second edge time point.

Furthermore, the impulse wireless communication system according to an embodiment of the inventive concept may further include a calculator that calculates the first envelope signal in the first modulation envelope signal based on the phase and the amplitude of the first modulation envelope signal and calculates the second envelope signal in the second modulation envelope signal based on the second time interval and the phase and the amplitude of the second modulation envelope signal.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Hereinafter, various embodiments of the inventive concept will be described more fully with reference to the accompanying drawings to such an extent as to be easily embodied by one skilled in the art. the inventive concept may be embodied in many different forms and should not be construed as limited to the embodiments set forth herein.

In drawings, components or elements not associated with the detailed description may be omitted to describe the inventive concept clearly, and like reference numerals refer to like elements throughout this application. Therefore, the reference numerals described above may be used in other drawings.

In addition, the size and thickness of each component shown in the drawings may be exaggerated for convenience of description. The inventive concept is not limited by the embodiments shown in the drawings. In the drawings, the thickness may be exaggerated in order to clearly express various layers and regions.

In addition, the expression "equal to or the same as" in the description may mean "substantially equal to or the same as". That is, it may be the same enough to convince those skilled in the art to be the same. Even other expressions may be expressions from which "substantially" is omitted.

Figure 1:
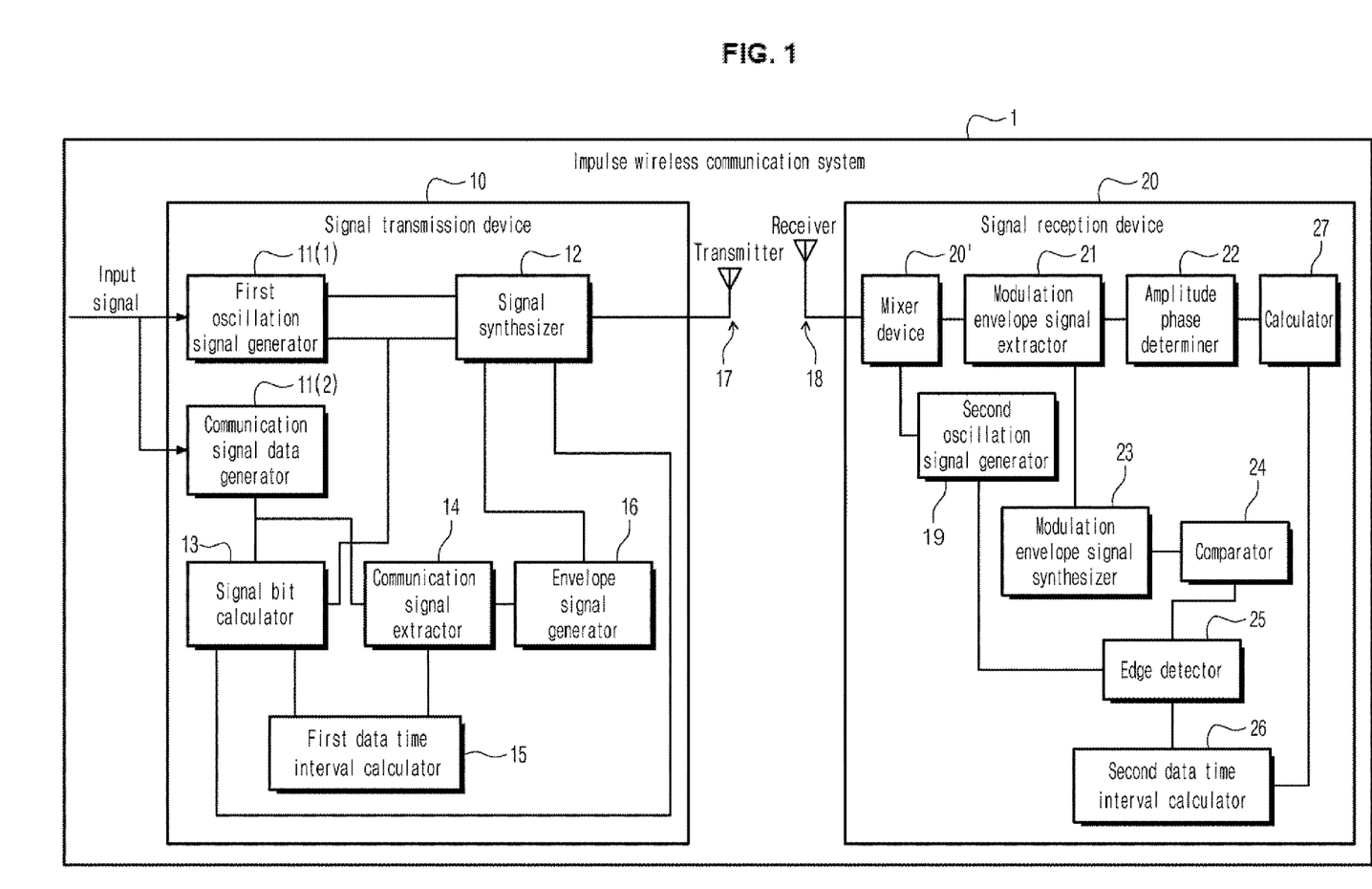
FIG. 1 is a drawing illustrating an impulse wireless communication system according to an embodiment of the inventive concept.

FIG. 1 is a drawing illustrating an impulse wireless communication system according to an embodiment of the inventive concept.

An impulse wireless communication system 1 according to an embodiment of the inventive concept may include a signal transmission device 10 and a signal reception device 20.

The signal transmission device 10 may include a first oscillation signal generator 11(1), a communication signal data generator 11(2), a signal synthesizer 12, a signal bit calculator 13, a communication signal extractor 14, a first data time interval calculator 15, an envelope signal generator 16, and a transmitter 17.

The first oscillation signal generator 11(1) may generate a plurality of oscillation signals (LO signals), which have a delay interval with each other and have the same or different phases and the same or different amplitudes, based on an input signal applied from the outside.

The plurality of oscillation signals (LO signals) generated by the oscillation signal generator 11(1) may be generated by a quadrature modulation scheme (or a quadrature amplitude modulation (QAM) scheme). The plurality of oscillation signals (LO signals) may be output with a ¼ period phase difference.

In detail, the plurality of oscillation signals (LO signals) generated by the oscillation signal generator 11(1) may be output at the same or different phases or the same or different amplitudes by the quadrature modulation scheme (or the QAM scheme).

The oscillation signal generator 11(1) may allocate a bit value to each of the plurality of oscillation signals (LO signals) in response to the amplitudes and phases of the plurality of oscillation signals (LO signals). According to an embodiment of the inventive concept, the oscillation signal generator 11(1) may allocate 4 bits in response to an amplitude and a phase of any one of the plurality of oscillation signals (LO signals) and may allocate 4 bits in response to an amplitude and a phase of another of the plurality of oscillation signals (LO signals), but the inventive concept is not limited thereto.

A description will be given of the process where the oscillation signal generator 11(1) generates the plurality of oscillation signals (LO signals) by the quadrature modulation scheme (or the QAM scheme) in detail below with reference to FIGS. 3A, 3B and 5.

The communication signal data generator 11(2) may generate communication signal data, which includes a sync signal (refer to FIG. 2) and a data signal (refer to FIG. 2) by a multi pulse position modulation (MPPM) scheme, in which a 1 period (PRF) has a frequency of 200 MHz. The communication signal data generator 11(2) may allocate a bit value indicating a position of the data signal with respect to the sync signal in the communication signal data.

According to an embodiment of the inventive concept, the communication signal data generator 11(2) may allocate a bit value indicating a position of the data signal with respect to the sync signal in the communication signal data as a 4-bit value, but the inventive concept is not limited thereto.

The communication signal data generator 11(2) may apply the communication signal data to the communication signal extractor 14 to generate an envelope signal for the sync signal. The communication signal data generator 11(2) may apply the communication signal data to the first data time interval calculator 15 and the communication signal extractor 14 to generate an envelope signal for the data signal.

The signal bit calculator 13 may calculate a bit value allocated to each of the plurality of oscillation signals (LO signals) generated by the first oscillation signal generator 11(1). The signal bit calculator 13 may calculate a bit value (4 bits) corresponding to an amplitude and a phase of any one oscillation signal (LO signal) generated by the oscillation signal generator 11(1). The signal bit calculator 13 may calculate a bit value (4 bits) corresponding to an amplitude and a phase of another oscillation signal (LO signal) generated by the oscillation signal generator 11(1).

The signal bit calculator 13 may calculate a bit value (4 bits) indicating a position of the data signal with respect to the sync signal in the communication signal data generated by the communication signal data generator 11(2).

A description will be given of the process where the signal bit calculator 13 calculates a bit value of any one oscillation signal, a bit value of another oscillation signal, and the bit value in the communication signal data in detail below with reference to FIGS. 2 and 5.

The communication signal extractor 14 may extract the sync signal based on the communication signal data generated by the communication signal data generator 11(2). The communication signal extractor 14 may extract the sync signal using a time interval from a time point when the sync signal in the communication signal data to a time point when the data signal is generated, which is generated calculated by the first data time interval calculator 15.

The first data time interval calculator 15 may calculate the time interval from the time point when the sync signal in the communication signal data is generated to the time point when the data signal is generated, using the bit value calculated by the signal bit calculator 13.

The envelope signal generator 16 may generate an envelope signal based on the sync signal extracted by the communication signal extractor 14. The envelope signal generator 16 may generate an envelope signal based on the data signal extracted by the communication signal extractor 14.

The signal synthesizer 12 may synthesize the plurality of oscillation signals (LO signals) generated by the oscillation signal generator 11(1), the plurality of envelope signals generated by the envelope signal generator 16, and oscillation bit data including bit values corresponding the phases and amplitudes of the plurality of oscillation signals (LO signals) to generate an impulse signal. At this time, the signal synthesizer 12 may provide the impulse signal to the transmitter 17.

Hereinafter, each of the envelope signals synthesized by the plurality of oscillation signals (LO signals) may be referred to as a modulation envelope signal, and the impulse signal may be formed by being synthesized with the plurality of modulation envelope signals.

The transmitter 17 may transmit the impulse signal to a receiver 18 of the signal reception device 20.

The signal reception device 20 may include the receiver 18, a second oscillation signal generator 19, a mixer device 20', a modulation envelope signal extractor 21, an amplitude phase determiner 22, a modulation envelope signal synthesizer 23, a comparator 24, an edge detector 25, a second data time interval calculator 26, and a calculator 27.

The receiver 18 may receive the impulse signal transmitted from the signal transmission device 10.

The second oscillation signal generator 19 may generate a plurality of oscillation signals using a sync start signal which is detected by the edge detector 25 based on the impulse signal and indicates a start time point of the sync signal. The plurality of oscillation signals generated by the second oscillation signal generator 19 may be generated by being synchronized with the plurality of oscillation signals generated by the first oscillation signal generator 11(1). Any one oscillation signal generated by the second oscillation signal generator 19 may have the same phase and amplitude as any one oscillation signal generated by the first oscillation signal generator 11(1). Another oscillation signal generated by the second oscillation signal generator 19 may have the same phase and amplitude as another oscillation signal generated by the first oscillation signal generator 11(1).

The second oscillation signal generator 19 may apply the plurality of oscillation signals generated by the second oscillation signal generator 19 to the mixer device 20'.

The mixer device 20' may mix or blend the plurality of oscillation signals with the impulse signal applied through the receiver 18.

The modulation envelope signal extractor 21 may extract a modulation envelope signal, the amplitude and the phase of which are modulated, based on any one of the plurality of oscillation signals and the impulse signal. The modulation envelope signal extractor 21 may extract a modulation envelope signal, the amplitude and the phase of which are modulated, based on another of the plurality of oscillation signals and the impulse signal.

The modulation envelope signal synthesizer 23 may synthesize the plurality of modulation envelope signals extracted by the modulation envelope signal extractor 21 into one synthesis modulation envelope signal. The synthesis modulation envelope signal may be composed in a form where two modulation envelope signals, the phases and the amplitudes of which are modulated by the plurality of oscillation signals in the signal synthesizer 12, have a certain delay duration with each other.

The comparator 24 may modulate the synthesis modulation envelope signal into a rectangular waveform in digital form to calculate signal generation time points of the plurality of modulation envelope signals making up the synthesis modulation envelope signal.

The edge detector 25 may detect a time point when a rising edge of the synthesis modulation envelope signal modulated into the rectangular waveform occurs.

The edge detector 25 may determine a time point when a first rising edge occurs in the synthesis modulation envelope signal as a time point when the sync signal is generated and may generate a sync start signal. The edge detector 25 may detect a time point when a first falling edge occurs in the synthesis modulation envelope signal.

The edge detector 25 may determine a time point when a second rising edge occurs in the synthesis modulation envelope signal as a time point when the data signal is generated and may generate a data start signal. The edge detector 25 may detect a time point when a second falling edge occurs in the synthesis modulation envelope signal.

The second data time interval calculator 26 may calculate a time interval which is an interval between a time point when a first modulation envelope signal is generated (or a time point when a first rising edge occurs) and a time point when a second modulation envelope signal is generated (or a time point when a second rising edge occurs), using the time point when the sync signal is generated and the time point when the data signal is generated.

The amplitude phase determiner 22 may determine an amplitude and a phase of the first modulation envelope signal based on the time point when the first rising edge detected by the edge detector 25 occurs and the time point when the first falling edge occurs. The amplitude phase determiner 22 may determine an amplitude and a phase of the second modulation envelope signal based on the time point when the second rising edge detected by the edge detector 25 occurs and the time point when the second falling edge occurs.

The calculator 27 may extract the envelope signal generated by the envelope signal generator 16 from the first modulation envelope signal, based on the amplitude and the phase of the modulation envelope signal, which are determined by the amplitude phase determiner 22.

The calculator 27 may extract the envelope signal generated by the envelope signal generator 16 from the second modulation envelope signal, using the amplitude and the phase determined by the amplitude phase determiner 22 and the time interval calculated by the second data time interval calculator 26.

Figure 2:
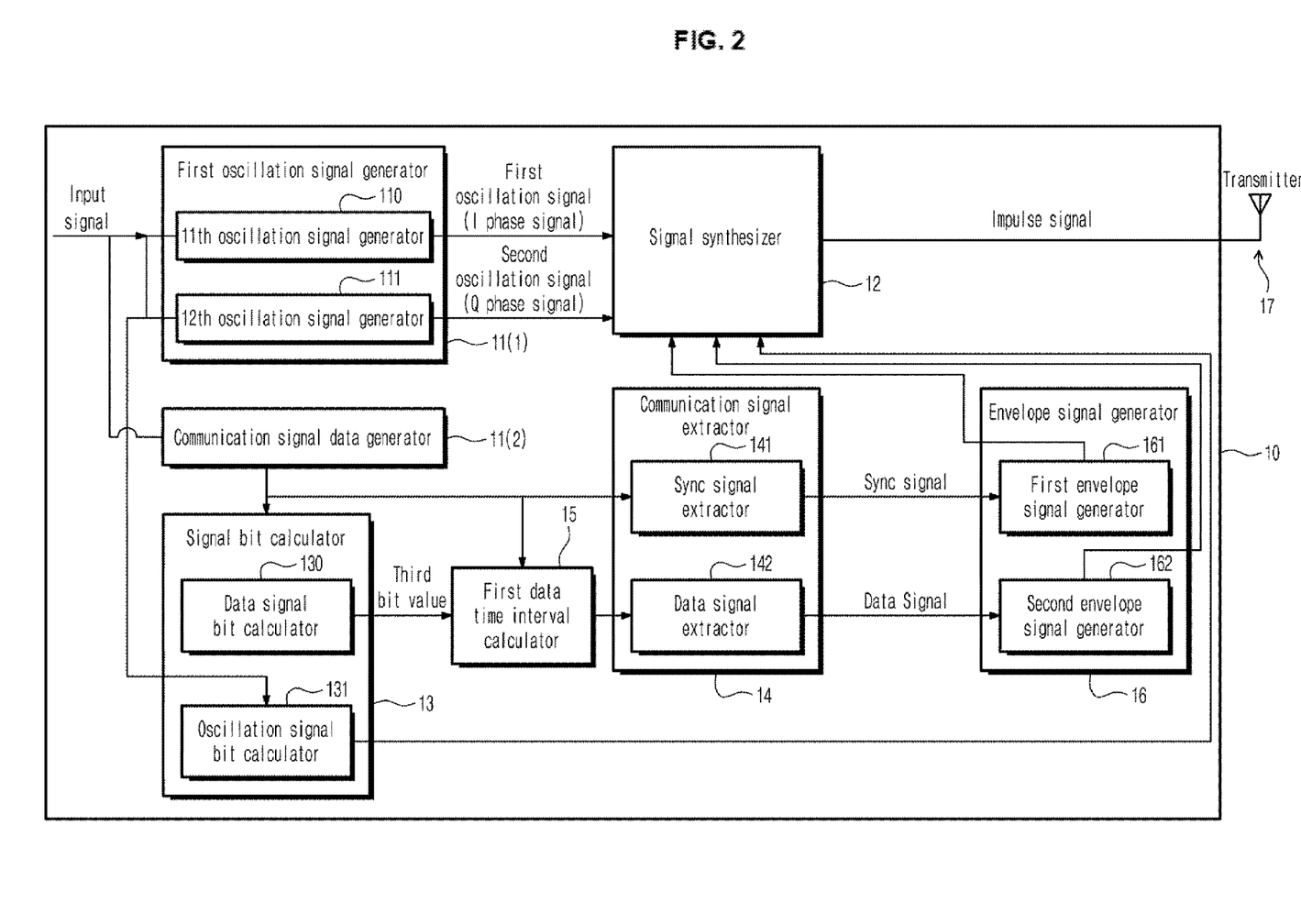
FIG. 2 is a drawing illustrating a signal transmission device according to an embodiment of the inventive concept.

FIG. 2 is a drawing illustrating a signal transmission device according to an embodiment of the inventive concept. FIGS. 3A and 3B are drawings for describing an MPPM scheme and a QAM scheme according to an embodiment of the inventive concept.

Hereinafter, a description which is substantially the same as or duplicated with FIG. 1 described above will be omitted.

Figure 3A:
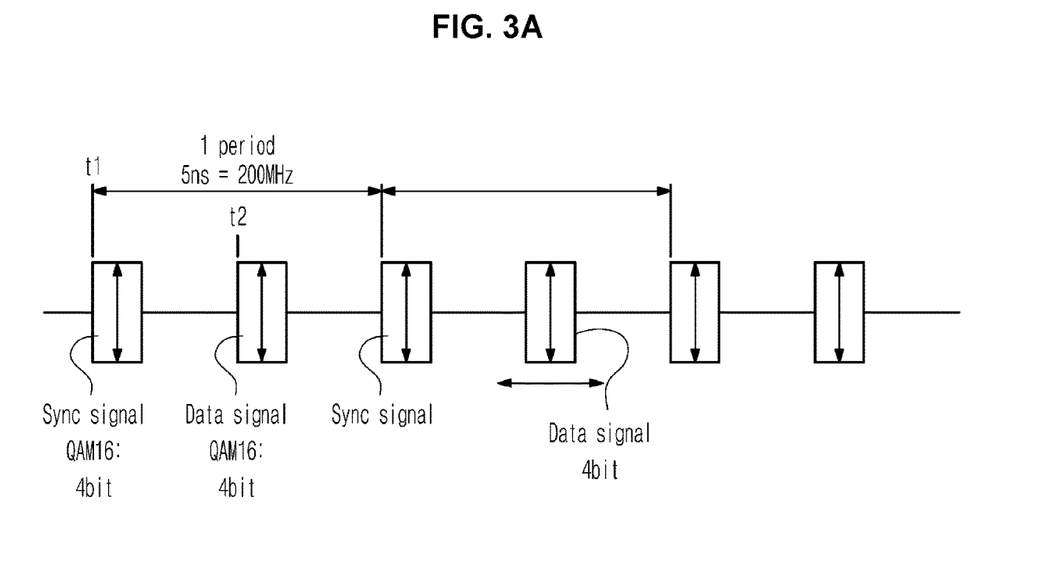
FIGS. 3A and 3B are drawings for describing an MPPM scheme and a QAM scheme according to an embodiment of the inventive concept.
Figure 3B:
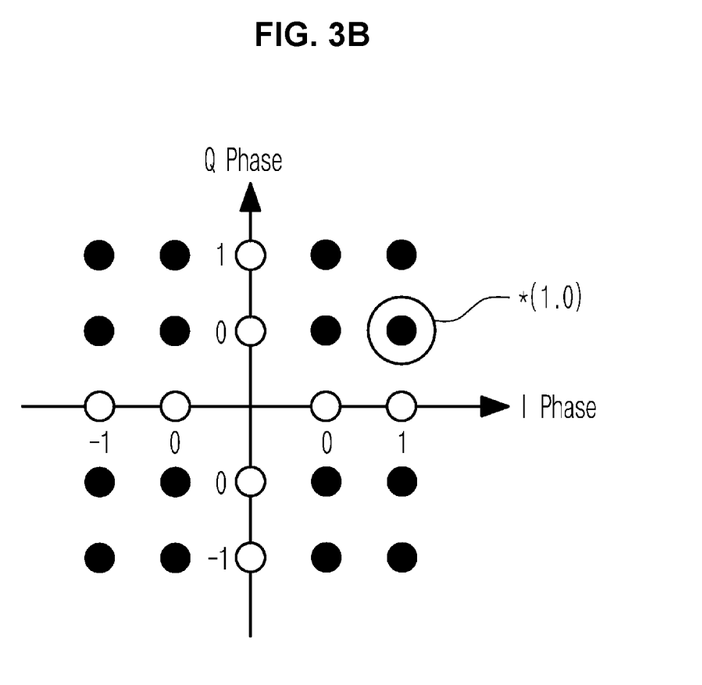

Referring to FIGS. 2 to 3B, a first oscillation signal generator 11(1) may include an 11th oscillation signal generator 110 and a 12th oscillation signal generator 111. A signal bit calculator 13 may include a data signal bit calculator 130 and an oscillation signal bit calculator 131. A communication signal extractor 14 may include a sync signal extractor 141 and a data signal extractor 142. An envelope signal generator 16 may include a first envelope signal generator 161 and a second envelope signal generator 162.

The 11th oscillation signal generator 110 may generate a first oscillation signal (or an I phase signal) based on an input signal applied from the outside. The first oscillation signal (or the I phase signal) may be output as a sine curve having a certain period, but the inventive concept is not limited thereto. The first oscillation signal (or the I phase signal) may be various curves which vibrate with a certain period.

The 12th oscillation signal generator 111 may generate a second oscillation signal (or a Q phase signal) based on the input signal applied from the outside. The second oscillation signal (or the Q phase signal) may be output with a delay interval of a ¼ period with respect to the first oscillation signal (or the I phase signal). The second oscillation signal (or the Q phase signal) may be output as a sine curve having the certain period, but the inventive concept is not limited thereto. The second oscillation signal (or the Q phase signal) may be various curves which vibrate with the certain period.

Referring to FIG. 3B, the first oscillation signal and the second oscillation signal respectively generated by the 11th oscillation signal generator 110 and the 12th oscillation signal generator 111 may have the same or different phases or the same or different amplitudes in a quadrature modulation scheme (or a QAM scheme) by a user setting.

Hereinafter, in the inventive concept, it is assumed that the first oscillation signal (or the I phase signal) and the second oscillation signal (or the Q phase signal) have the same phase depending on the quadrature modulation scheme (or the QAM scheme) by the user setting and that the amplitude of the second oscillation signal (or the Q phase signal) is generated according to a first modulation point (*, (1.0)) which is half the amplitude of the first oscillation signal (or the I phase signal) in FIG. 3B. The second oscillation signal generated based on the quadrature modulation scheme (or the QAM scheme) according to the first modulation point (*, (1.0)) may be output with the same phase as the first oscillation, half the amplitude of the first oscillation, and a delay interval of a ¼ period with the first oscillation.

The 11th oscillation signal generator 110 may generate a first oscillation signal transmitted according to a first amplitude and a first phase and may allocate a 4-bit value to the first oscillation signal. The 12th oscillation signal generator 111 may generate a second oscillation signal transmitted according to a second amplitude and a second phase and may allocate a 4-bit value to the second oscillation signal.

The data signal bit calculator 130 included in the signal bit calculator 13 may calculate a 4-bit value (hereinafter referred to as a "third bit value") indicating a position of a data signal with respect to a sync signal in a communication signal data.

The oscillation signal bit calculator 131 included in the signal bit calculator 13 may calculate a 4-bit value (hereinafter referred to as a "first bit value") based on the first phase and the first amplitude of the first oscillation signal generated by the 11th oscillation signal generator 110. The oscillation signal bit calculator 131 included in the signal bit calculator 13 may calculate a 4-bit value (hereinafter referred to as a "second bit value") based on the second phase and the second amplitude of the second oscillation signal generated by the 12th oscillation signal generator 111.

The sync signal extractor 141 included in the communication signal extractor 14 may extract the sync signal from the communication signal data generated by the communication signal data generator 11(2). The data signal extractor 142 included in the communication signal extractor 14 may extract the data signal using a first time interval from a time point when the sync signal is generated to a time point when the data signal is generated, which is calculated by the first data time interval calculator 15.

The first data time interval calculator 15 may calculate the first time interval from the time point when the sync signal is generated to the time point when the data signal is generated, using the third bit value (the 4-bit value) calculated by the data signal bit calculator 130.

The first envelope signal generator 161 included in the envelope signal generator 16 may generate a first envelope signal based on the sync signal extracted by the sync signal extractor 141. The second envelope signal generator 162 included in the envelope signal generator 16 may generate a second envelope signal based on the data signal extracted by the data signal extractor 142.

The signal synthesizer 12 may synthesize the first oscillation signal generated by the 11th oscillation signal generator 110, the second oscillation signal generated by the 12th oscillation signal generator 111, the first envelope signal generated by the first envelope signal generator 161, the second envelope signal generated by the second envelope signal generator 162, and the oscillation bit data (the third bit value) generated by the oscillation signal bit calculator 131 to generate an impulse signal.

Figure 4:
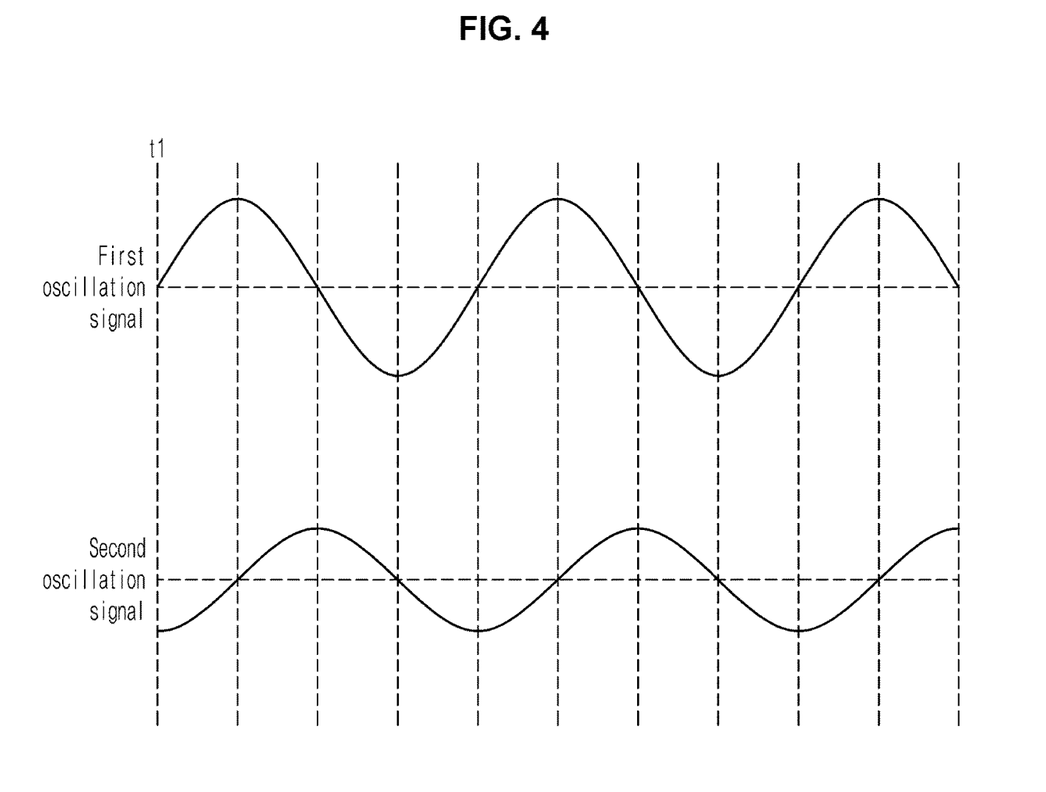
FIG. 4 is a waveform diagram of a first oscillation signal and a second oscillation signal according to an embodiment of the inventive concept.

FIG. 4 is a waveform diagram of a first oscillation signal and a second oscillation signal according to an embodiment of the inventive concept.

Referring to FIG. 4, it is assumed that the first oscillation signal (or an I phase signal) generated by an 11th oscillation signal generator 110 according to an embodiment of the inventive concept is output in the form of a sine curve with a certain period.

The first oscillation signal generated by the 11th oscillation signal generator 110 based on a quadrature modulation scheme (or a QAM scheme) may have a first phase and a first amplitude, may vibrate according to a certain period, and may be output from a first time point t1. A second oscillation signal generated by a 12th oscillation signal generator 111 based on the quadrature modulation scheme (or the QAM scheme) may have a second phase and a second amplitude, may be delayed by a ¼ period with respect to the first oscillation signal to vibrate according to a certain period, and may be output from the first time point t1.

At this time, because the inventive concept uses the quadrature modulation scheme (or the QAM scheme) based on a first modulation point (*, (1.0)) depending on a setting of a user, the amplitude of the second oscillation signal may be half the amplitude of the first oscillation signal. Furthermore, the phase of the second oscillation signal may be the same as the phase of the first oscillation signal.

Figure 5:
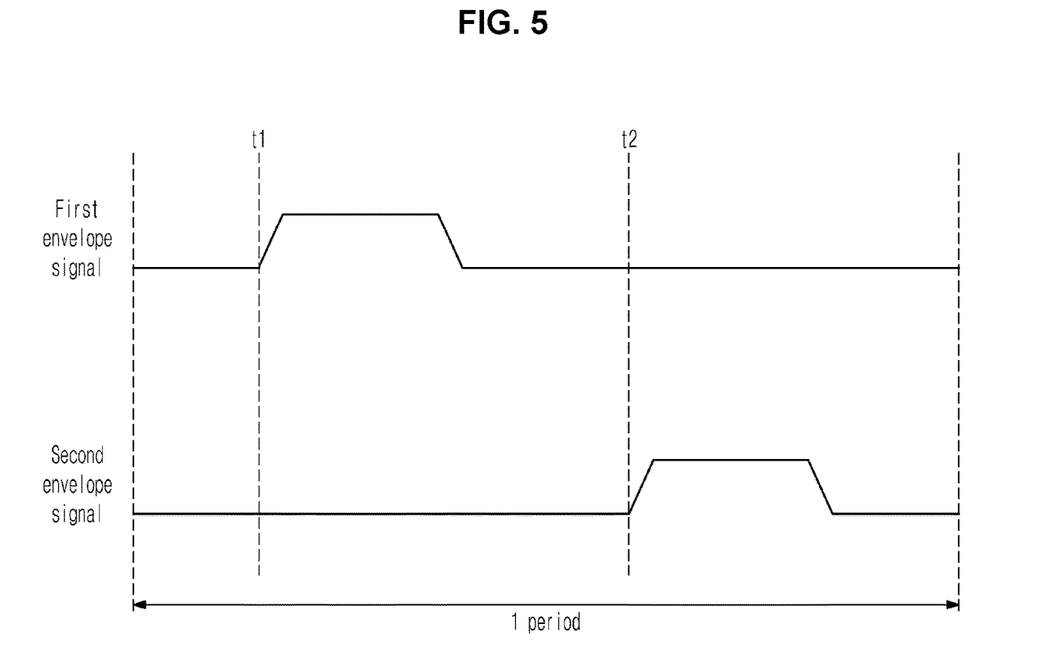
FIG. 5 is a waveform diagram of a first envelope signal and a second envelope signal according to an embodiment of the inventive concept.

FIG. 5 is a waveform diagram of a first envelope signal and a second envelope signal according to an embodiment of the inventive concept.

Referring to FIG. 5, the first envelope signal according to an embodiment of the inventive concept may be generated only during a certain duration from a first time point t1 when a first oscillation signal is generated.

Furthermore, the second envelope signal according to an embodiment of the inventive concept may be generated only during a certain duration from a second time point t2 when a data signal in communication signal data is generated.

According to an embodiment of the inventive concept, because the first envelope signal is generated based on a sync signal included in the communication signal data and because the second envelope signal is generated based on the data signal included in the communication signal data, the second envelope signal may be generated at the second time point t2 after the first time point t1 when the first envelope signal is generated.

As described above in FIGS. 2 to 5, a signal transmission device 10 according to an embodiment of the inventive concept may generate an envelope signal based on the communication signal data in an MPPM scheme and may allocate a certain bit value (a 4-bit value and a third bit value). The signal transmission device 10 according to an embodiment of the inventive concept may generate a plurality of oscillation signals (LO signals) in the QAM scheme and may allocate a certain bit value (a 4-bit value, a first bit value, and a second bit value). The signal transmission device 10 according to an embodiment of the inventive concept may synthesize the envelope signal generated by the MPPM scheme with the plurality of oscillation signals generated by the QAM scheme to generate an impulse signal and may transmit the impulse signal to a signal reception device 20.

Figure 6:
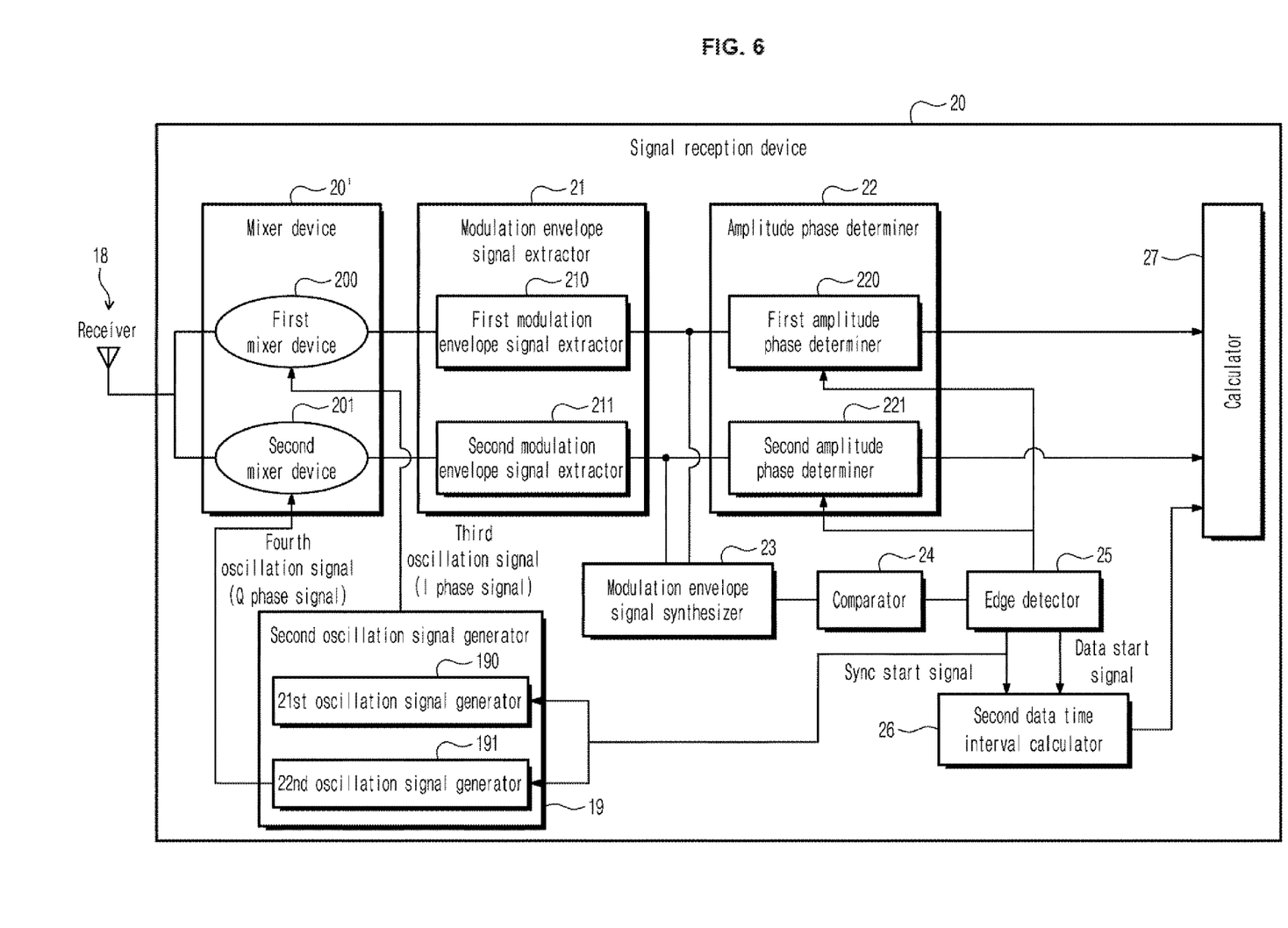
FIG. 6 is a drawing illustrating a signal reception device according to an embodiment of the inventive concept.
Figure 7:
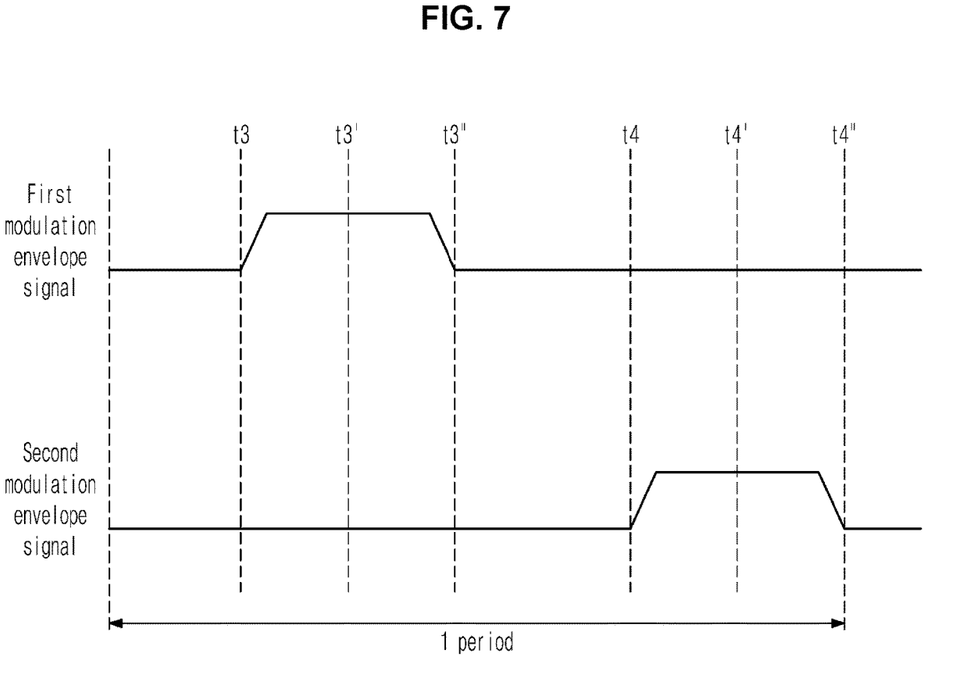
FIG. 7 is a drawing illustrating a first modulation envelope signal and a second modulation envelope signal according to an embodiment of the inventive concept.

FIG. 6 is a drawing illustrating a signal reception device according to an embodiment of the inventive concept. FIG. 7 is a drawing illustrating a first modulation envelope signal and a second modulation envelope signal according to an embodiment of the inventive concept.

Hereinafter, a description which is substantially the same as or duplicated with FIG. 1 described above will be omitted.

A second oscillation signal generator 19 may include a 21st oscillation signal generator 190 and a 22nd oscillation signal generator 191. A mixer device 20' may include a first mixer device 200 and a second mixer device 201. A modulation envelope signal extractor 21 may include a first modulation envelope signal extractor 210 and a second modulation envelope signal extractor 211. An amplitude phase determiner 22 may include a first amplitude phase determiner 220 and a second amplitude phase determiner 221.

The 21st oscillation signal generator 190 may generate a third oscillation signal based on a sync start signal which is generated by an edge detector 25 and indicates a start time point t1 of a sync signal. The 22nd oscillation signal generator 191 may generate a fourth oscillation signal using the sync start signal which is generated by the edge detector 25 and indicates the start time point t1 of the sync signal.

At this time, the third oscillation signal generated by the 21st oscillation signal generator 190 and the fourth oscillation signal generated by the 22nd oscillation signal generator 191 may be output with a delay interval of a ¼ period with each other based on the sync start signal.

At this time, the third oscillation signal generated by the 21st oscillation signal generator 190 may be synchronized with a first oscillation signal generated by a first oscillation signal generator 11(1) based on the sync start signal. In other words, the third oscillation signal may have a certain delay duration (t3−t1) (refer to FIG. 8), which is a signal transmission time from a signal transmission device 10 to a signal reception device 20, and may have a first phase, which is the same phase as the first oscillation signal, and a first amplitude, which is the same amplitude as the first oscillation signal. In other words, the third oscillation signal generated by the 21st oscillation signal generator 190 may be generated from a third time point t3.

The fourth oscillation signal generated by the 22nd oscillation signal generator 191 may be synchronized with a second oscillation signal generated by the first oscillation signal generator 11(1) based on the sync start signal. In other words, the fourth oscillation signal may have the certain delay duration (t3−t1), which is the signal transmission time from the signal transmission device 10 to the signal reception device 20, and may have a second phase, which is the same phase as the second oscillation signal, and a second amplitude, which is the same amplitude as the second oscillation signal. In other words, the fourth oscillation signal generated by the 22nd oscillation signal generator 191 may be generated from the third time point t3.

The first mixer device 200 may mix or blend an impulse signal received through a receiver 18 with the third oscillation signal (or the I phase signal) received through the 21st oscillation signal generator 190.

The second mixer device 201 may mix or blend the impulse signal received through the receiver 18 with the fourth oscillation signal (or the Q phase signal) received through the 22nd oscillation signal generator 191.

The first modulation envelope signal extractor 210 may extract a first modulation envelope signal, the phase and the amplitude of which are modulated according to the first oscillation signal, using the impulse signal and the third oscillation signal blended by the first mixer device 200.

The second modulation envelope signal extractor 211 may extract a second modulation envelope signal, the phase and the amplitude of which are modulated according to the second oscillation signal, using the impulse signal and the fourth oscillation signal blended by the second mixer device 201.

At this time, the first modulation envelope signal may be in the form of a signal output during a certain duration from the third time point t3 which is a time point when the certain delay duration (t3−t1) elapses from the first time point t1. The second modulation envelope signal may be in the form of a signal output during a certain duration from the fourth time point t4 which is a time point when the certain delay duration (t3−t1) elapses from the second time point t2.

The modulation envelope signal synthesizer 23 may synthesize the first modulation envelope signal and the second modulation envelope signal into one signal. At this time, the synthesis modulation envelope signal synthesized by the modulation envelope signal synthesizer 23 may be in the form of the first modulation envelope signal during a certain duration from the third time point t3 to a third time t3" and may be in the form of the second modulation envelope signal during a certain duration from the fourth point t4 to a fourth time point t4".

A comparator 24 may modulate the synthesis modulation envelope signal into a rectangular wave in digital form. In detail, the comparator 24 may modulate the first modulation envelope signal into the rectangular wave during a certain duration from the third time point t3 to the third time point t3" in the synthesis modulation envelope signal.

The comparator 24 may modulate the second modulation envelope signal into the rectangular wave during a certain duration from the fourth time point t4 to the fourth time point t4" in the synthesis modulation envelope signal.

An edge detector 25 may detect the third time point t3 which is a time point when a first rising edge occurs in the synthesis modulation envelope signal modulated into the rectangular wave. The edge detector 25 may detect the third time point t3" which is a time point when a first falling edge occurs in the synthesis modulation envelope signal modulated into the rectangular wave.

The edge detector 25 may detect the fourth time point t4 which is a time point when a second rising edge occurs in the synthesis modulation envelope signal modulated into the rectangular wave. The edge detector 25 may detect the fourth time point t4" which is a time point when a second falling edge occurs in the synthesis modulation envelope signal modulated into the rectangular wave.

The edge detector 25 may determine the third time point t3 as a time point when the sync signal is generated and may generate a sync start signal. The edge detector 25 may determine the fourth time point t4 as a time point when a data signal is generated and may generate a data start signal.

The edge detector 25 may apply the third time point t3 when the first modulation envelope signal starts to be generated and the third time point t3" when the first modulation envelope signal stops being generated to the first amplitude phase determiner 220. The edge detector 25 may apply the fourth time point t4 when the second modulation envelope signal starts to be generated and the fourth time point t4" when the second modulation envelope signal stops being generated to the second amplitude phase determiner 221.

A second data time interval calculator 26 may detect a time interval which is an interval between a time point when the first modulation envelope signal is generated and a time point when the second modulation envelope signal is generated, using the third time point t3 when the sync start signal is generated and the fourth time point t4 when the data start signal is generated.

The second data time interval calculator 26 may apply a time interval (t4−t3) which is an interval between the time point when the first modulation envelope signal is generated and the time point when the second modulation envelope signal is generated to a calculator 27.

The first amplitude phase determiner 220 may detect a third phase and a third amplitude of the first modulation envelope signal modulated by the first oscillation signal (or the third oscillation signal) using the first modulation envelope signal extracted by the first modulation envelope signal extractor 210 and the third time point t3 and the third time point t3" detected by the edge detector 25.

In detail, the first amplitude phase determiner 220 may determine the third phase and the third amplitude of the first modulation envelope signal modulated by the first oscillation signal (or the third oscillation signal) at a third time point t3' which is a midpoint between the third time point t3 and the third time point t3".

The first amplitude phase determiner 220 may provide the calculator 27 with the third phase and the third amplitude of the first modulation envelope signal modulated by the first oscillation signal (or the third oscillation signal) determined at the third time point t3'.

The second amplitude phase determiner 221 may detect a fourth phase and a fourth amplitude of the second modulation envelope signal modulated by the second oscillation signal (or the fourth oscillation signal) using the second modulation envelope signal extracted by the second modulation envelope signal extractor 211 and the fourth time point t4 and the fourth time point t4" detected by the edge detector 25.

In detail, the second amplitude phase determiner 221 may determine the fourth phase and the fourth amplitude of the second modulation envelope signal modulated by the second oscillation signal (or the fourth oscillation signal) at a fourth time point t4' which is a midpoint between the fourth time point t4 and the fourth time point t4".

The calculator 27 may generate the first envelope signal generated by the first envelope signal generator 161 using the third phase and the third amplitude determined by the first amplitude phase determiner 220 and the first modulation envelope signal extracted by the first modulation envelope signal extractor 210.

In detail, the calculator 27 may demodulate the first phase and the first amplitude of the first envelope signal based on the third phase and the third amplitude in the first modulation envelope signal. As a result, the calculator 27 may extract the first envelope signal.

The calculator 27 may generate the second envelope signal generated by the second envelope signal generator 162 using the fourth phase and the fourth amplitude determined by the second amplitude phase determiner 221, the second modulation envelope signal extracted by the second modulation envelope signal extractor 211, and the time interval calculated by the second data time interval calculator 26.

In detail, the calculator 27 may demodulate the second phase and the second amplitude of the second envelope signal based on the fourth phase and the fourth amplitude in the second modulation envelope signal. Furthermore, the calculator 27 may extract the second envelope signal using the time interval.

Figure 8:
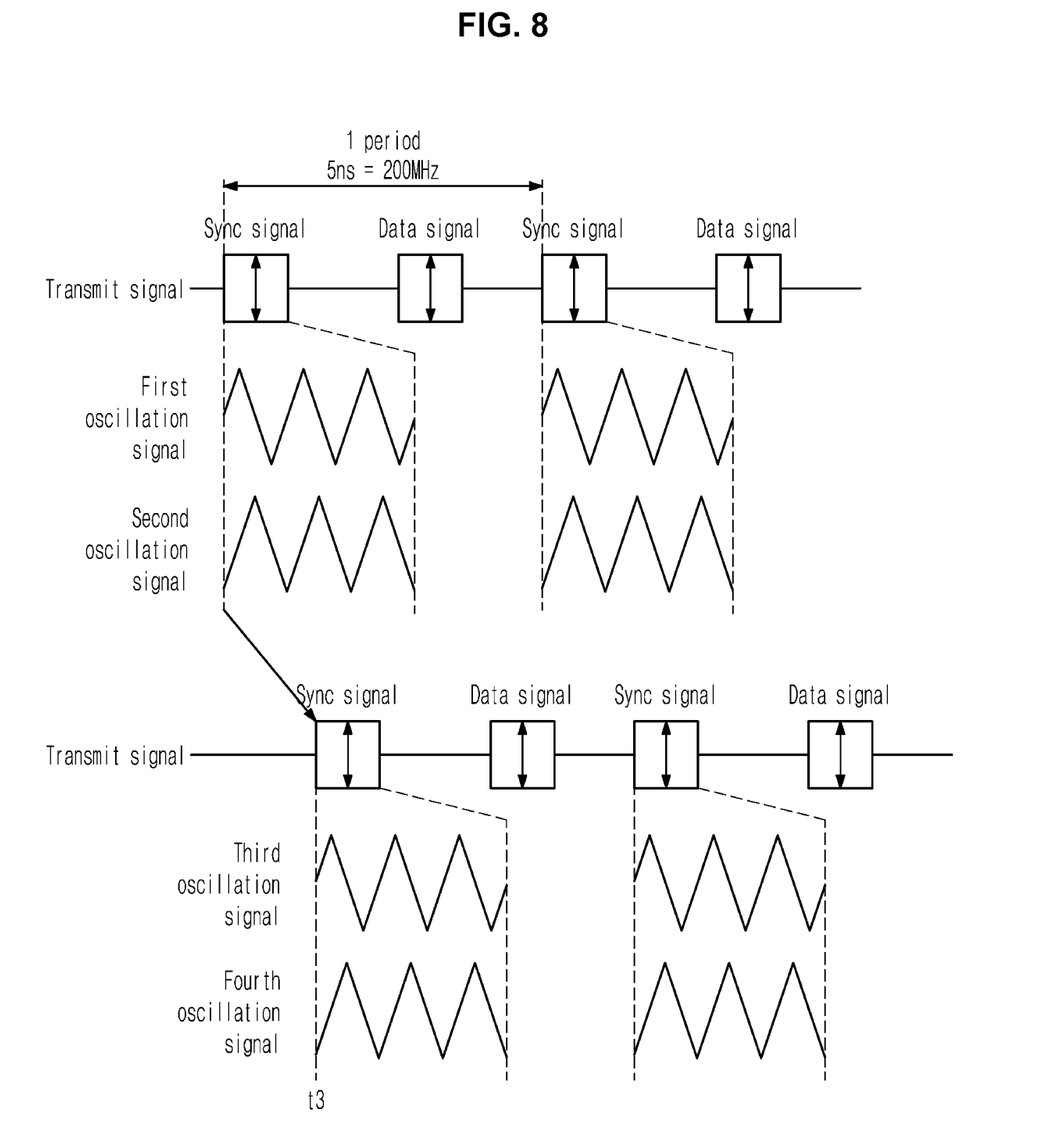
FIG. 8 is a drawing for describing a transmit signal output from a signal transmission device and a receive signal received in a signal reception according to an embodiment of the inventive concept.

FIG. 8 is a drawing for describing a transmit signal output from a signal transmission device and a receive signal received in a signal reception according to an embodiment of the inventive concept.

Referring to FIG. 8, a signal transmission device 10 according to an embodiment of the inventive concept may mix the first oscillation signal and the second oscillation signal, which are generated in an quadrature modulation scheme (or a QAM scheme) and have a ¼ period with each other, with communication signal data including a sync signal and a data signal, which is generated in an MPPM scheme and has one period of 200 MHz, to generate an impulse signal and may transmit the impulse signal to a signal reception device 20.

The signal reception device 20 according to an embodiment of the inventive concept may be synchronized with the signal transmission device 10 based on the impulse signal transmitted from the signal transmission device 10.

The signal reception device 20 may internally generate a third oscillation signal and a fourth oscillation signal, which have a delay duration of a certain signal transmission duration (t3–t1) with the first oscillation signal and the second oscillation signal, and may demodulate a plurality of envelope signals transmitted from the signal transmission device 10 in the impulse signal received based on the third oscillation signal and the fourth oscillation signal.

Furthermore, the signal reception device 20 may extract the communication signal data including the sync signal and the data signal, which has one period of 200 MHz, based on the plurality of demodulated envelope signals.

The broadband impulse wireless communication system according to the inventive concept may combine different modulation schemes to perform wireless communication of an impulse signal, thus increasing a wireless communication speed.

While the inventive concept has been described in connection with what is presently considered to be practical embodiments, it is to be understood that the inventive concept is not limited to the disclosed embodiments, but, on the contrary, is intended to cover various modifications and equivalent arrangements included within the spirit and scope of the appended claims. Therefore, those skilled in the art will understand that various modifications and other equivalent embodiments of the inventive concept are possible. Consequently, the true technical protective scope of the inventive concept must be determined based on the technical spirit of the appended claims.

What is claimed is:

1. An impulse wireless communication system, comprising:
   an oscillation signal generator configured to generate a plurality of oscillation signals having a delay interval with each other and having the same phase and amplitude or different phases and amplitudes;
   an envelope signal generator configured to extract a sync signal and a data signal making up communication signal data and generate an envelope signal for the sync signal and an envelope signal for the data signal;
   a signal synthesizer configured to synthesize the plurality of oscillation signals with the envelope signals to generate an impulse signal;
   an envelope signal extractor synchronized with the oscillation signal generator based on the sync signal and configured to extract a plurality of modulation envelope signals from the impulse signal;
   an amplitude phase determiner configured to determine the phase and the amplitude in the plurality of modulation envelope signals based on the plurality of oscillation signals; and
   a calculator configured to extract the envelope signals from the plurality of modulation envelope signals based on the phase and the amplitude.

2. The impulse wireless communication system of claim 1, wherein the oscillation signal generator includes:
   a first oscillation signal generator configured to generate a first oscillation signal transmitted according to a first amplitude and a first phase corresponding to a first bit value; and
   a second oscillation signal generator configured to generate a second oscillation signal transmitted according to a second amplitude and a second phase, which correspond to a second bit value and are the same as or different from the first amplitude and the first phase.

3. The impulse wireless communication system of claim 2, further comprising:
   a data signal bit calculator configured to calculate a third bit value indicating a position of the data signal with respect to the sync signal in the communication signal data; and
   a first data time interval calculator configured to calculate a first time interval between a time point when the sync signal is generated and a time point when the data signal is generated, based on the third bit value.

4. The impulse wireless communication system of claim 3, further comprising:
   a sync signal extractor configured to extract the sync signal from the communication signal data;
   a data signal extractor configured to extract the data signal where the first time interval is delayed with respect to the sync signal from the communication signal data using the first time interval;
   a first envelope signal generator configured to generate a first envelope signal based on the sync signal; and
   a second envelope signal generator configured to generate a second envelope signal based on the data signal.

5. The impulse wireless communication system of claim 4, further comprising:
an oscillation signal bit calculator configured to calculate oscillation bit data including the first bit value and the second bit value.

6. The impulse wireless communication system of claim 4, further comprising:
a third oscillation signal generator configured to generate a third oscillation signal having the same phase as the first phase of the first oscillation signal and the same amplitude as the first amplitude of the first oscillation signal based on the sync signal; and
a fourth oscillation signal generator configured to generate a fourth oscillation signal having the same phase as the second phase of the second oscillation signal and the same amplitude as the second amplitude of the second oscillation signal based on the sync signal.

7. The impulse wireless communication system of claim 6, further comprising:
a first modulation envelope signal extractor configured to mix the third oscillation signal with the impulse signal and extract a first modulation envelope signal corresponding to the first envelope signal; and
a second modulation envelope signal extractor configured to mix the fourth oscillation signal with the impulse signal and extract a second modulation envelope signal corresponding to the second envelope signal.

8. The impulse wireless communication system of claim 7, further comprising:
a modulation envelope signal synthesizer configured to synthesize the first modulation envelope signal with the second modulation envelope signal to generate a first synthesis modulation envelope signal;
a comparator configured to change the first synthesis modulation envelope signal corresponding to an analog signal to a second synthesis modulation envelope signal in the form of a rectangular wave; and
an edge detector configured to detect a first edge time point when a waveform of the first modulation envelope signal rises and a first falling time point when the waveform of the first modulation envelope signal falls in the second synthesis modulation envelope signal and detect a second edge time point when a waveform of the second modulation envelope signal rises and a second falling time point when the waveform of the second modulation envelope signal falls in the second synthesis modulation envelope signal.

9. The impulse wireless communication system of claim 8, further comprising:
a first amplitude phase determiner configured to determine the phase and the amplitude of the first modulation envelope signal corresponding to the first bit value based on the first edge time point and the first falling time point; and
a second amplitude phase determiner configured to determine the phase and the amplitude of the second modulation envelope signal corresponding to the second bit value based on the second edge time point and the second falling time point.

10. The impulse wireless communication system of claim 9, further comprising:
a second data time interval calculator configured to calculate a second time interval between a time point when the first modulation envelope signal is generated and a time point when the second modulation envelope signal is generated, based on the first edge time point and the second edge time point.

11. The impulse wireless communication system of claim 10, further comprising:
a calculator configured to calculate the first envelope signal in the first modulation envelope signal based on the phase and the amplitude of the first modulation envelope signal and calculate the second envelope signal in the second modulation envelope signal based on the second time interval and the phase and the amplitude of the second modulation envelope signal.

\* \* \* \* \*